(12) United States Patent
Oesterling et al.

(10) Patent No.: US 10,685,240 B2
(45) Date of Patent: Jun. 16, 2020

(54) VIDEO AND/OR IMAGE MAPPING SYSTEM

(71) Applicant: General Motors LLC, Detroit, MI (US)

(72) Inventors: Christopher L. Oesterling, Troy, MI (US); Paul H. Pebbles, Novi, MI (US)

(73) Assignee: General Motors LLC, Detroit, MI (US)

( * ) Notice: Subject to any disclaimer, the term of this patent is extended or adjusted under 35 U.S.C. 154(b) by 46 days.

(21) Appl. No.: 16/139,447

(22) Filed: Sep. 24, 2018

(65) Prior Publication Data

US 2020/0097737 A1    Mar. 26, 2020

(51) Int. Cl.
| | |
|---|---|
| *G06K 9/00* | (2006.01) |
| *B60R 11/04* | (2006.01) |
| *H04W 4/021* | (2018.01) |
| *G06T 3/40* | (2006.01) |
| *G01C 21/34* | (2006.01) |
| *G01C 21/32* | (2006.01) |

(52) U.S. Cl.
CPC .......... *G06K 9/00791* (2013.01); *B60R 11/04* (2013.01); *G01C 21/32* (2013.01); *G01C 21/3415* (2013.01); *G06T 3/4038* (2013.01); *H04W 4/021* (2013.01)

(58) Field of Classification Search
CPC combination set(s) only.
See application file for complete search history.

(56) References Cited

U.S. PATENT DOCUMENTS

| | | | |
|---|---|---|---|
| 10,218,941 B1* | 2/2019 | Park | H04W 4/02 |
| 2016/0006922 A1* | 1/2016 | Boudreau | H04N 5/23206 |
| | | | 348/207.1 |
| 2016/0334227 A1* | 11/2016 | Davidson | G01C 21/34 |
| 2018/0357907 A1* | 12/2018 | Reiley | H04W 4/023 |
| 2019/0260970 A1* | 8/2019 | Lu | B60R 1/00 |
| 2019/0375427 A1* | 12/2019 | Whitt | H04W 4/029 |

* cited by examiner

*Primary Examiner* — Janese Duley

(57) ABSTRACT

A method for capturing video and/or images for a mapping system includes, in a vehicle, wirelessly receiving a request from a remote server for videos and/or images. The request specifies a location and a heading for the videos and/or images. The method includes comparing a vehicle location and a vehicle heading to the location and heading of the request. If a match occurs, recording a video and/or an image corresponding to the location and heading and uploading the video and/or image to the remote server.

20 Claims, 6 Drawing Sheets

VIDEO AND/OR IMAGE MAPPING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Internet-based applications or apps provide a variety of services and are accessible by computers, smartphones, tablets, vehicles, etc. via the Internet. For example, mapping applications provide maps of a particular address. Mapping applications typically provide turn-by-turn directions from a current location to a destination address. Mapping applications also typically provide images of areas surrounding a particular destination. The images are often captured by specialized vehicles that are driven down the streets to capture the images. This approach for capturing images is expensive and time consuming.

SUMMARY

A method for capturing video and/or images for a mapping system includes wirelessly receiving a request from a remote server for videos and/or images in a vehicle. The request specifies a location and a heading for the videos and/or images. The method includes comparing a vehicle location and a vehicle heading to the location and heading of the request. If a match occurs, the method includes recording a video and/or an image corresponding to the location and heading and uploading the video and/or image to the remote server.

In other features, the request further specifies a time of day. The video and/or the image are recorded during daylight and not recorded when daylight is absent. The method includes recording the video and/or image using a camera mounted on the vehicle. The camera is mounted facing a direction of travel of the vehicle.

In other features, the method includes recording the video and/or image using a plurality of cameras mounted on the vehicle. At least one of the plurality of cameras is mounted facing a direction of travel of the vehicle and another one of the plurality of cameras is mounted facing a direction perpendicular to the direction of travel. The videos and/or images from the plurality of cameras are stitched together.

In other features, the vehicle performs at least one of ride sharing, vehicle sharing, and autonomous operation. The method includes identifying a location of the vehicle relative to a geofenced area and receiving a plurality of requests for the vehicle. The plurality of requests are limited to the geofenced area.

In other features, the vehicle is used for ridesharing and further comprising altering a route of the vehicle to include the location and heading of the request. The vehicle is used for ridesharing and the method further includes receiving a video and/or image ridesharing request. The video and/or image ridesharing request includes a route including the location and heading of the request and does not involve driving a ridesharing passenger.

A method for capturing video and/or images for a mapping system includes recording a plurality of videos and/or images during operation of a vehicle; storing the plurality of videos and/or images along with vehicle locations and a vehicle headings, respectively; wirelessly receiving a request from a remote server for a video and/or an image. The request specifies a location and a heading for the video and/or image. The method includes comparing the vehicle locations and the vehicle headings of the plurality of videos and/or images to the location and the heading of the request; and if a match occurs, uploading the video and/or image for the request to the remote server.

In other features, the request further specifies a time of day. The plurality of videos and/or images are recorded during daylight and not recorded when daylight is absent. The method includes recording the video and/or image using a camera mounted on the vehicle. The camera is mounted facing a direction of travel of the vehicle.

In other features, the method includes recording the video and/or image using a plurality of cameras mounted on the vehicle. The videos and/or images from the plurality of cameras are stitched together. At least one of the plurality of cameras is mounted facing a direction of travel of the vehicle and another one of the plurality of cameras is mounted facing a direction perpendicular to the direction of travel.

In other features, the method includes identifying a location of a vehicle relative to a geofenced area; and receiving a plurality of requests for the vehicle. The plurality of requests are limited to the geofenced area. The vehicle is used for ridesharing and the method further comprises altering a route of the vehicle to include the location and heading of the request.

In other features, the vehicle is used for ridesharing and further comprising receiving a video and/or image ridesharing request. The video and/or image ridesharing request includes a route including the location and heading of the request and does not involve driving a ridesharing passenger.

A video and/or image mapping system for a vehicle includes a transceiver module configured to communicate with a remote server. An outwardly-directed camera is configured to record videos and/or images. An image capture module is configured to at least one of a) receive a request at the vehicle for a video and/or an image from a remote server, wherein the request identifies a location and heading; and cause the outwardly-directed camera to record a video and/or an image when a location and heading of the vehicle matches the location and the heading of the request; and/or b) record a plurality of videos and/or images during operation of the vehicle; store the plurality of videos and/or images along with a location and heading of the vehicle; receive a request from a remote server for a video and/or an image, wherein the request specifies a location and a heading for the video and/or image; compare the locations and heading of the vehicle for the plurality of videos and/or images to the location and the heading of the request; and if a match occurs, upload the video and/or image for the request to the remote server.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
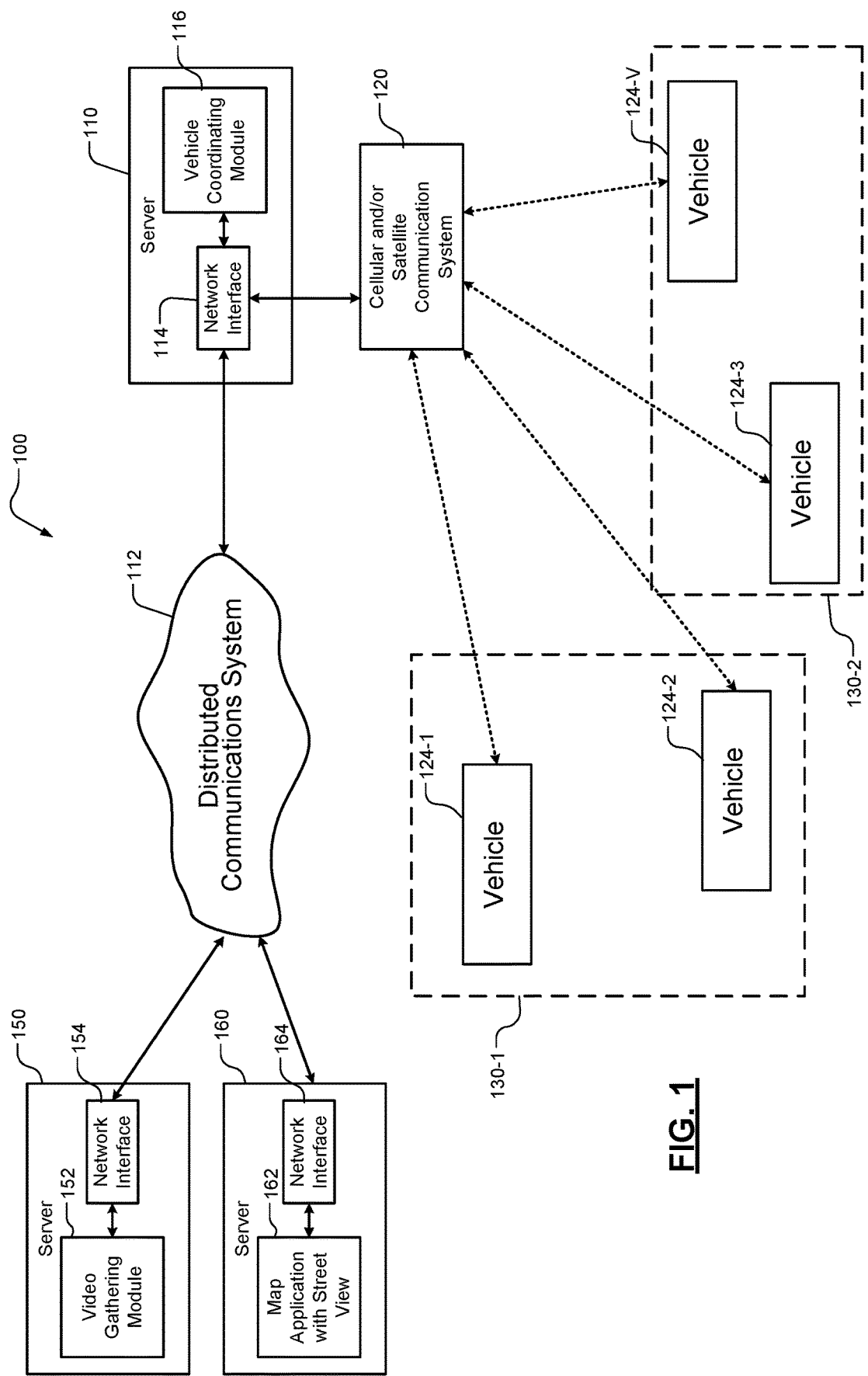
FIG. 1 is a functional block diagram of a video and/or image mapping system according to the present disclosure.

Some passenger vehicles such as car sharing and ride sharing vehicles are equipped with inwardly and outwardly directed camera modules. The camera modules may be used to monitor driving behavior, accidents, local traffic and/or other events. In some examples, the camera modules also include a global positioning system (GPS), an inertial sensor, and/or a cellular data module. When a vehicle collision occurs, video and/or images are uploaded to the manufacturer or another server for review. Some vehicles are also equipped with a transceiver (e.g. a telematics system such as OnStar®) that can communicate with a remote server and/or remotely supply additional vehicle telemetry information such as speed, heading, location, diagnostic data, odometer, fuel level, etc.

Mapping services such as Google maps and/or Apple maps rely on specialized vehicles to capture video and/or images along roadways or streets. The videos and/or images provide a street view at a destination location. The process for capturing video and/or images takes a long time and is relatively expensive due to the number of streets. Furthermore, the videos and/or images need to be updated since the streets and their surroundings change over time.

A video and/or image mapping system according to the present disclosure leverages camera-equipped vehicles such as passenger vehicles, autonomous vehicles, car sharing vehicles and/or ride sharing vehicles to capture near real-time video and/or images that can be used by mapping companies and/or other services. When installed in vehicles, an opt-in process may be used to enable video and/or image capture in customer-owned vehicles.

Vehicles are contacted via the transceiver with specific requests for video and/or images from certain locations. For example, the specific requests can be geofenced points of interest and may include location and heading (direction) information, time of day, etc. For example only, time of day may be important when attempting to use the video and/or images for traffic monitoring and/or providing additional views of an accident. When the vehicle location, heading and/or other criteria match one of the requests, the video and/or images are captured by the vehicle and uploaded to a server. In some examples, the process can be transparent to the driver and/or passengers. In other examples, the driver can be made aware (e.g. using the display, a car sharing application, or ride sharing application) of nearby locations requiring video and/or images (and compensation in some form can be provided as an incentive).

A field of view (FOV) of a camera for a passenger vehicle is generally limited to about 120 degrees. In some examples, vehicle cameras with larger FOVs are used and/or additional cameras are installed. For example, the vehicle may include one or more cameras arranged perpendicular to a direction of vehicle travel and/or another camera pointed directly forward and/or backward at a road surface. When multiple cameras are used, the images from multiple cameras can be stitched together either prior to upload or after upload.

Depending upon the desired video and/or images, a server may select some vehicles over others. For example, when street view video is desired, vehicles having side-directed cameras can be selected and other vehicles (not having the side-directed cameras) are not selected. In other situations, video from vehicles that do not have side-directed cameras may be suitable.

In another video and/or image mapping system according to the present disclosure, vehicles automatically record video and/or images with location and heading information, time etc. when the vehicle is being driven. The video and/or images are stored. The video and/or image mapping system requests video from the vehicles in the network and stitches together video and/or images from a plurality of vehicles. The video and/or image mapping system sends a broadcast signal requesting video and/or images for particular locations and headings. Vehicles that have the video and/or images can upload them.

Vehicle sensors (such as those used for dead-reckoning) can be leveraged for more precise camera image capturing. Dead-reckoning is the process of calculating a vehicle's current position using a previously determined position, or fix, and advancing that position based upon known or estimated speeds over elapsed time and course. For example, dead-reckoning can be calculated based on a prior GPS position and wheel rotational (sensed by wheel position sensors that record wheel rotation) and steering direction.

Live view capability can be used for live feedback (e.g. for traffic/accident verification). Ride sharing routing can be adjusted to generate captured images. The video and/or image mapping system can also provide incentives for ride sharing drivers to perform ghost rides with no passengers. The video and/or image mapping system also works well in autonomous vehicles and autonomous ride sharing vehicles. Events such as accidents that occurred in the past can be reviewed from different angles for analysis, etc. Parked vehicles can also be used as static probes.

In addition to modifying a ridesharing route to pass and obtain video and/or images of a location of interest, the server can generate a ghost ridesharing reservation where a non-passenger rideshare reservation is made to direct a ridesharing vehicle to pass an area of interest. In a carsharing (or rental) reservation, the server may offer the driver a financial incentive to return the vehicle to an alternative location to allow the vehicle to pass and obtain video and/or images of a location of interest.

Referring now to FIG. 1, a video and/or image mapping system 100 is shown and includes a server 110 including a network interface 114 and a vehicle coordinating module 116. The network interface 114 is connected to a distributed communication system 112 such as the Internet and a cellular and/or satellite communication system 120. A plurality of vehicles 124-1, 124-2, 124-3, . . . and 124-V (collectively vehicles 124) (where V is an integer greater than two) travel on roadways and communicate with the server via the cellular and/or satellite communication system 120.

In some examples, the vehicle coordinating module 116 identifies a location of the vehicles 124 relative to a plurality of geofences 130-1, . . . and 130-F (collectively geofences 130). In other words, the vehicles 124 are associated with one of the geofences 130 as will be described further below. A geofence is a virtual geographic boundary, defined by GPS technology, which enables software to trigger a response when a mobile device enters or leaves a particular area. In other words, to reduce bandwidth, the requests that are sent are limited. In other words, the vehicle coordination module 116 will forward requests that are pertinent to the geofence or geofences where the vehicle is typically located.

A server 150 includes a video and/or image gathering module 152 and a network interface 154. The video and/or image gathering module 152 requests video and/or images by sending requests via the distributed communication system 112 to the server 110. The vehicle coordinating module 116 of the server 110 sends the requests to the vehicles 124 in a corresponding one of the geofences 130.

One or more of the vehicles 124 obtain the video or images and send the video and/or images back to the vehicle coordinating module 116 of the server 110, which forwards the video and/or images to the server 150. At this point, the vehicle coordinating module 116 may cancel the requests stored by other vehicles to prevent duplication of effort.

Once received, the video and/or image gathering module 152 may optionally perform video and/or image processing and then forward the video and/or images to a server 160 for use. Alternately, the vehicle coordinating module 116 may optionally perform video and/or image processing. In some examples, the server 160 includes a map application 162 with street view capability. The server 160 communicates with the server 150 and/or user devices (not shown) via a network interface 164.

Figure 2A:
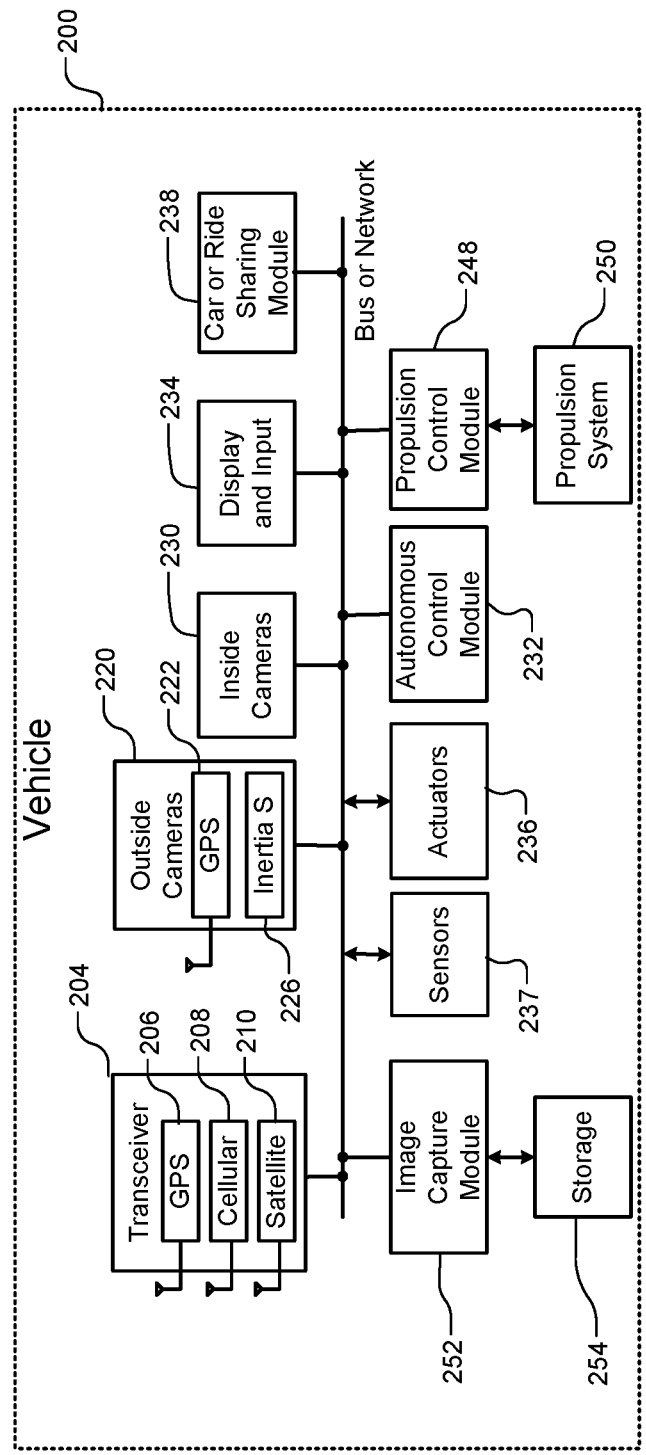
FIG. 2A is a functional block diagram of an example of a vehicle that captures videos and/or images for the video and/or image mapping system according to the present disclosure.

Referring now to FIG. 2A, an example of a vehicle 200 in the video and/or image mapping system 100 is shown. The vehicle 200 includes a transceiver 204 such as a telematics module that can wirelessly communicate with a remote server. For example, the transceiver 204 may include a system such as OnStar®. In some examples, the transceiver 204 includes a global positioning system (GPS) 206 and cellular and/or satellite communication modules 208 and 210, respectively. As can be appreciated, components within the vehicle can communicate over one or more buses (such as a CAN bus) or other vehicle network.

The vehicle 200 further includes one or more outside-directed cameras 220. In some examples, the outside-directed cameras 220 include a GPS 222 and/or an inertia sensor 226. The vehicle 200 may further include one or more inside-directed cameras 230. The vehicle 200 includes a display and an input device 234. In some examples, the display and input device 234 includes a touchscreen monitor, although other types of displays and/or input devices can be used. For example, the display and input device 234 may be used by vehicle sharing or ride sharing applications to display pickup locations, directions to the pickup locations or destinations, alternative routes including points of interest or other information.

The vehicle 200 further includes an image capture module 252 to capture and store videos and/or images on a storage system 254. In some examples, the storage system 254 includes a hard disk drive, flash memory or other persistent memory.

In some examples, the vehicle 200 includes an autonomous control module 232, actuators 236 and sensors 237 for performing autonomous driving functions. In some examples, the actuators 236 control steering, throttle, braking and/or other functions of the vehicle without user input. In some examples, the sensors 237 include proximity sensors, radar sensors, lidar sensors and/or other types of sensors.

In other examples, the vehicle 200 includes a vehicle sharing module 238. For example for car sharing applications, the vehicle sharing module 238 includes an application to allow a user to open doors of the vehicle without needing a key. For example, the user identifies a ride sharing vehicle and uses a smartphone to request use of the ride sharing vehicle. The application sends authorization to the vehicle and the user's smartphone. Thereafter, the user uses the smartphone to open the doors and start the vehicle. For example for ride sharing applications, the vehicle sharing module 238 runs an application that identifies passengers needing rides, routes to/from pickup locations and destinations, and payment handling information. Examples of ride sharing applications include Maven, Uber and Lyft.

A propulsion control module 248 controls a propulsion system 250. For example only, the propulsion system 250 may include an engine (such as an internal combustion engine or a diesel engine), an electric motor, or combinations thereof.

Figure 2B:
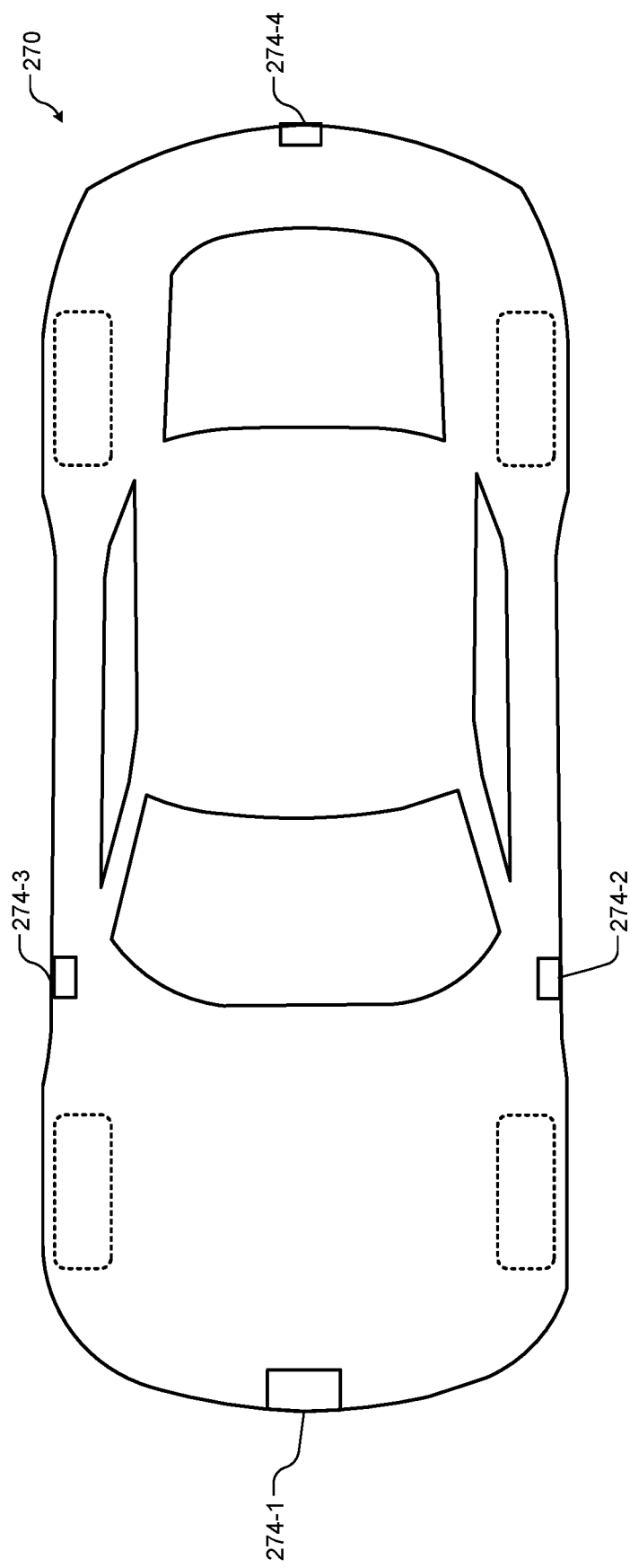
FIG. 2B illustrates a vehicle including multiple cameras.

Referring now to FIG. 2B, a vehicle 270 is shown with outside-directed cameras 274-1, 274-2, 274-3 and 274-4 (collectively outside-directed cameras 274). As can be appreciated, the vehicle 270 includes at least one camera that is forward directed. Additional cameras can be used if desired. In this example, the camera 274-1 is forward looking and is located on a front side of the vehicle 270. The cameras 274-2 and 274-3 are side looking and are located along opposing sides of the vehicle 270. The camera 274-4 is rearward looking and is arranged along a rear side of the vehicle 270. In some examples, the FOV of the camera 274-1 overlaps with the FOV of the cameras 274-2, 274-3. In some examples, the FOV of the camera 274-4 overlaps with the FOV of the cameras 274-2, 274-3.

Figure 3:
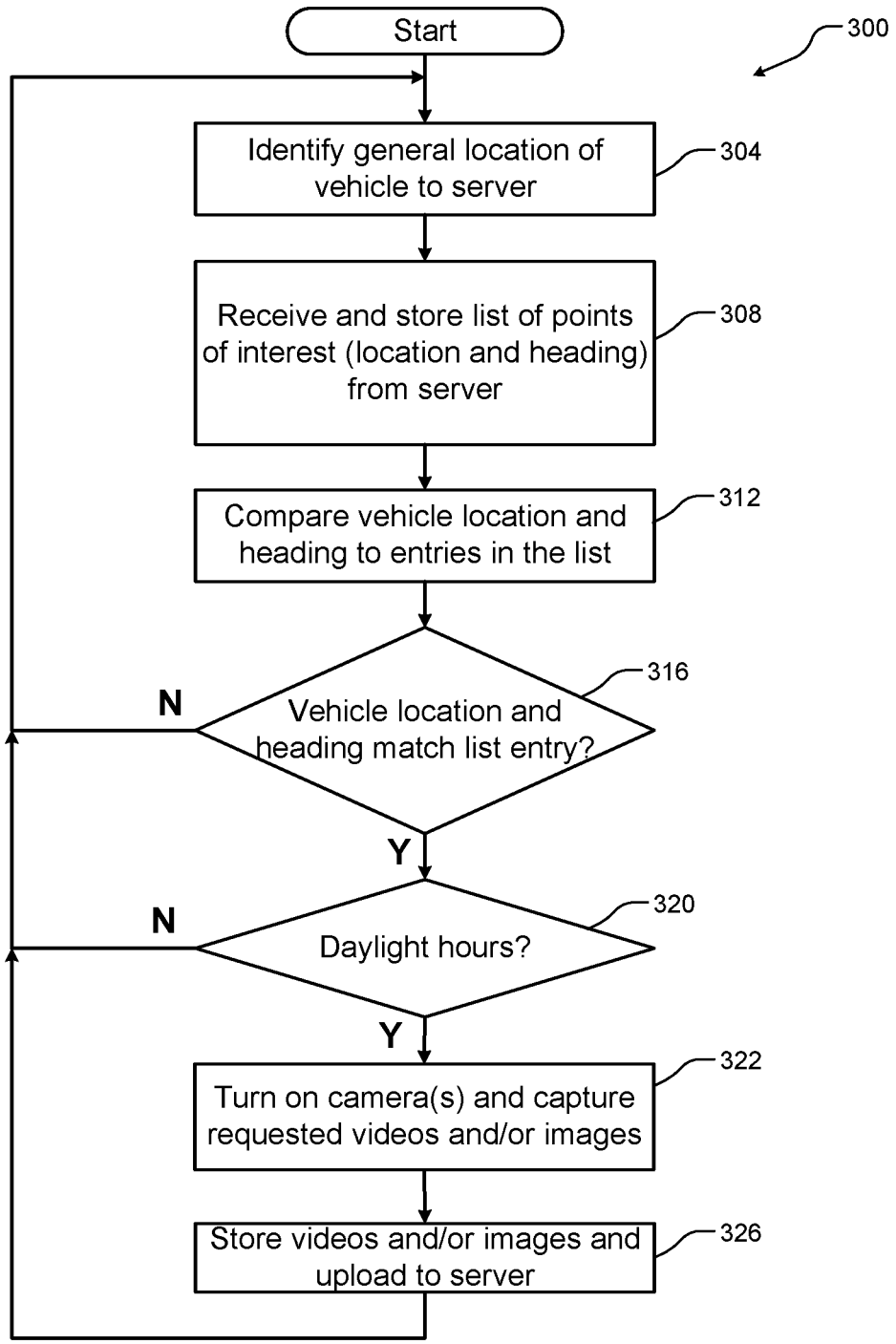
FIG. 3 is a flowchart of an example of a method for operating the video and/or image mapping system according to the present disclosure.

Referring now to FIG. 3, a method 300 for operating the video and/or image mapping system is shown. At 304, the method includes identifying a general location of the vehicle to a remote server. In response to the vehicle's location, one or more requests (typically defined by location, heading, and/or other criteria) in one or more geofenced areas are identified, sent to the vehicle and received by the vehicle at 308. At 312, the vehicle compares the location, heading, and/or other criteria of the vehicle to the requests. At 316, the method determines whether the location, heading, and/or other criteria matches a location, heading, and/or other criteria of the requests.

If 316 is true, the method proceeds to 320 and optionally determines whether there is sufficient light for a video and/or image of the point of interest. IN some examples, the video and/or images can still be taken at night. If 320 is true, the method continues at 322 and turns on the camera and captures a video and/or an image of the requested point of interest. At 326, the videos and/or images are stored and wirelessly uploaded to a remote server. In some examples, the uploading may be delayed until the vehicle is located near a known or public WiFi station such as at a user's home or work.

Figure 4:
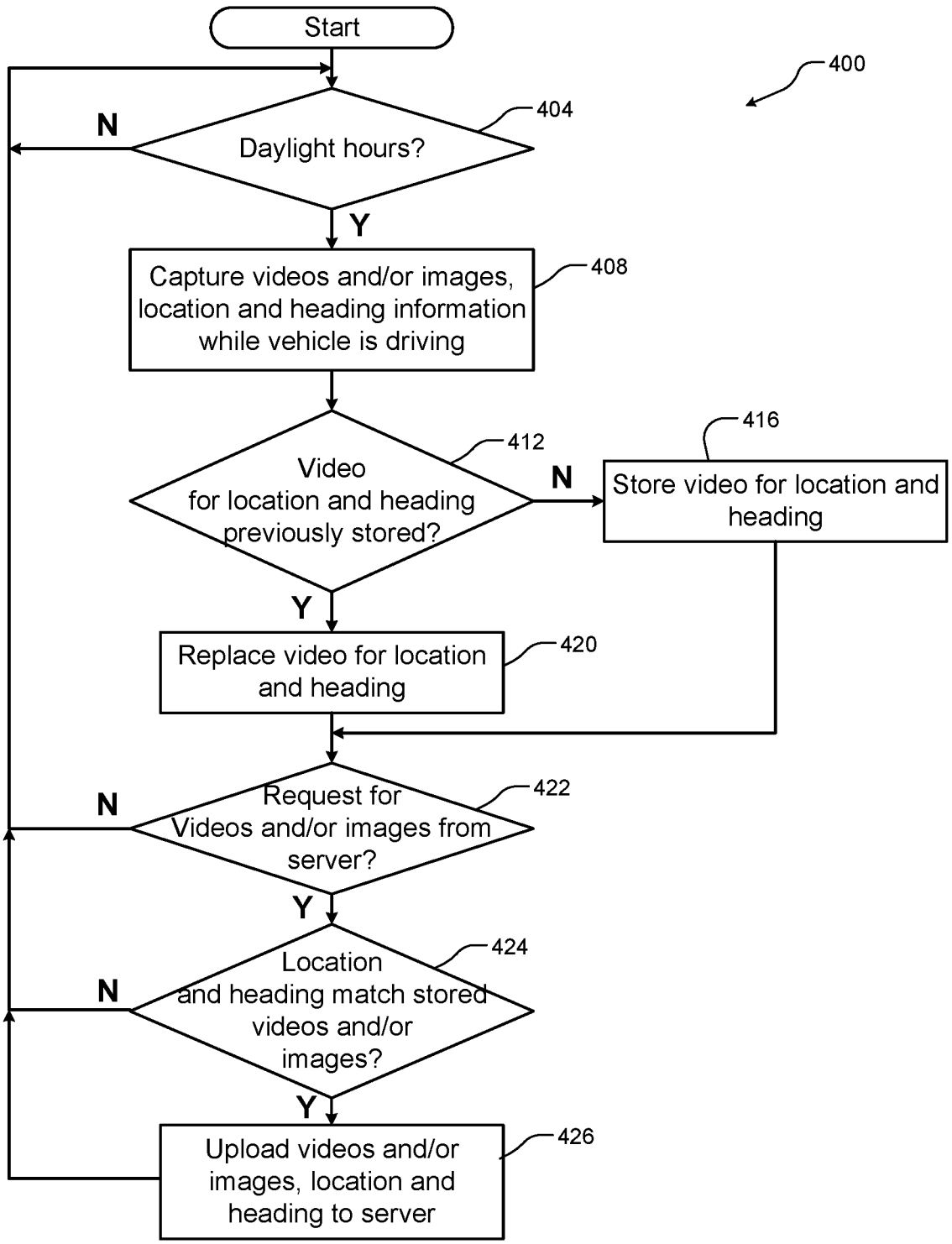
FIG. 4 is a flowchart of another example of a method for operating the video and/or image mapping system according to the present disclosure.

Referring now to FIG. 4, another method 400 for operating the video and/or image mapping system is shown. At 404, the method optionally determines whether or not the vehicle is operating during daylight hours. In some examples, the video and/or images are not taken during low light hours. In other examples, video and/or images are taken during hours between dusk and dawn.

At 408, the vehicle captures videos and and/or images, location and heading information while the vehicle is driving. At 412, the method determines whether the video and/or image for the location and heading were previously stored. If 412 is false, the video and/or image is stored for the location and heading at 416. If 412 is true, the method replaces the video and/or image for the location and heading at 420. At 422, the method determines whether a request for the video and/or image is received from a remote server. If 422 is true, the method determines whether the location and heading match video and/or image stored by the vehicle. If 424 is true, the videos and/or images are uploaded to the remote server at 426.

Figure 5:
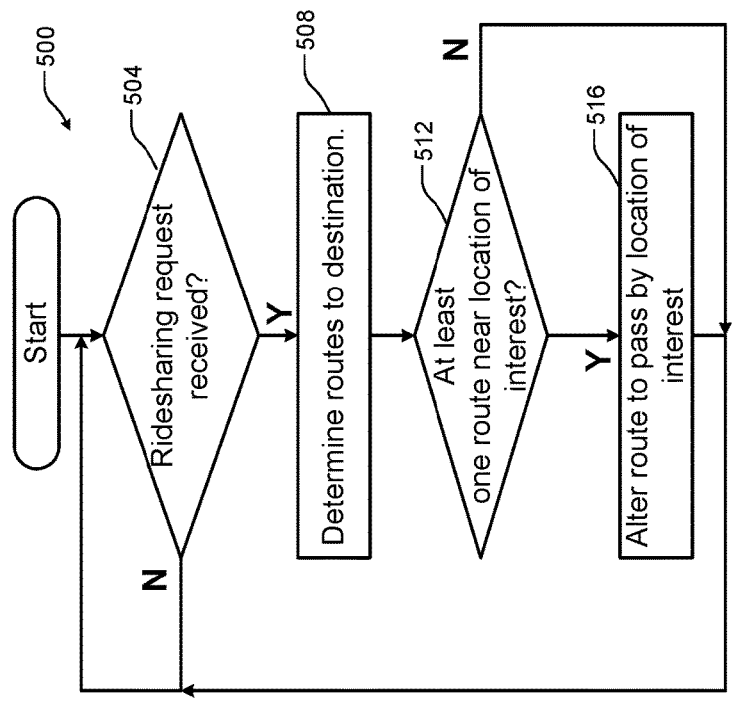
FIG. 5 is a flowchart of an example of a method for altering a ridesharing route to include a location of interest to obtain video and/or images according to the present disclosure.

Referring now to FIG. 5, a method 500 for altering a ridesharing route to include a location of interest to obtain video and/or images is shown. At 504, the method determines whether a ridesharing request is received. If 504 is true, routes are determined for a destination address at 508. At 512, the method determines whether or not at least one route passes within a predetermined extra distance or extra travel time to a location of interest. If 512 is true, the method alters the route to pass by the location of interest at 516.

In some examples, the route is modified when the predetermined extra distance or extra travel time are limited to a distance such as a value in a range from 0.5 to 10 miles or an extra travel time of 1 to 10 minutes.

Figure 6:
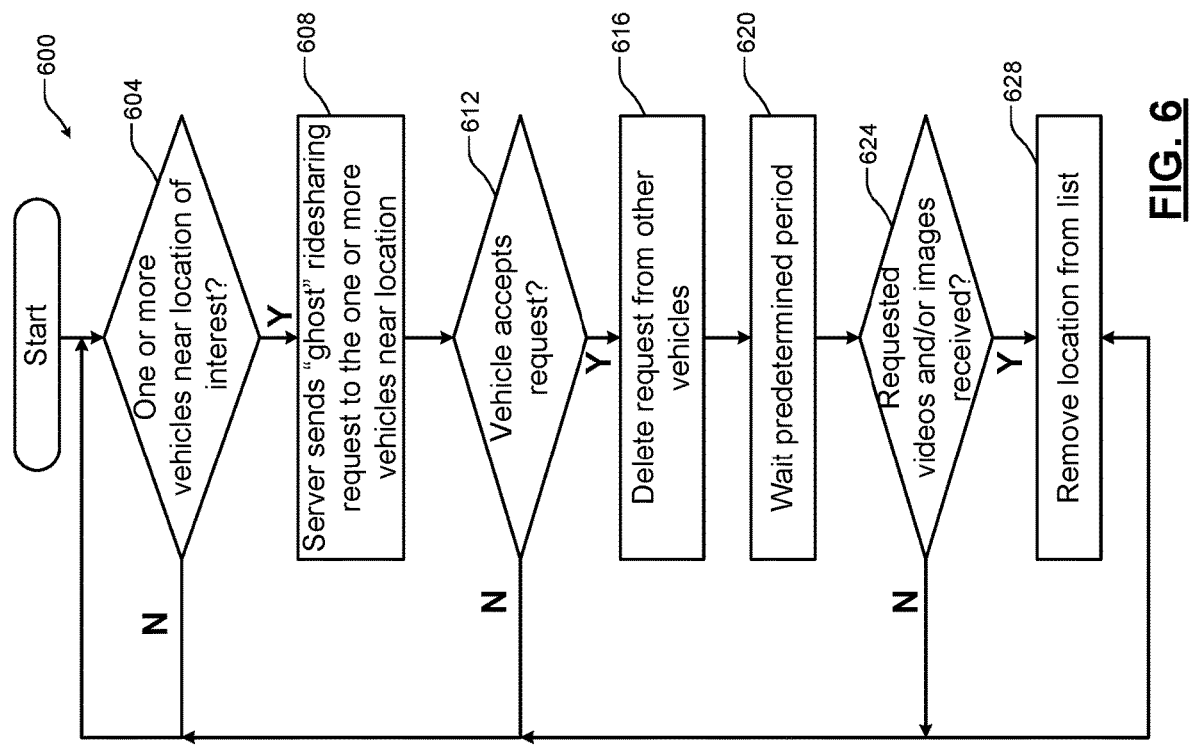
FIG. 6 is a flowchart of an example of a method for using "ghost" ridesharing requests to obtain video and/or images according to the present disclosure.

Referring now to FIG. 6, a method 600 for using "ghost" ridesharing requests to obtain video and/or images is shown. At 604, the method determines whether or not one or more vehicles are near a location of interest. If 604 is true, the server sends "ghost" ridesharing requests to the one or more vehicles near the location. At 612, the method determines whether one of the vehicles accepts the request. If 612 is true, the request is deleted from other vehicles at 616. At 620, the method waits a predetermined period to allow the request to be fulfilled. At 624, the method determines whether or not the requested video and/or images are received. If 624 is true, the location is removed from the list of locations needing video and/or images at 628. If 624 is false, the method returns to 604 and seeks the video and/or images from another vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for capturing video and/or images for a mapping system, comprising:
   in a vehicle, wirelessly receiving a request from a remote server for videos and/or images,
   wherein the request specifies a location and a heading for the videos and/or images;
   comparing a vehicle location and a vehicle heading to the location and heading of the request; and
   if a match occurs, recording a video and/or an image corresponding to the location and heading using a camera built into the vehicle; and
   uploading the video and/or image to the remote server.

2. The method of claim 1, wherein the request further specifies a time of day.

3. The method of claim 1, wherein the video and/or the image are recorded during daylight and not recorded when daylight is absent.

4. The method of claim 1, further comprising recording the video and/or image using a camera mounted on the vehicle, wherein the camera is mounted facing a direction of travel of the vehicle.

5. The method of claim 4, further comprising recording the video and/or image using a plurality of cameras mounted on the vehicle, wherein at least one of the plurality of cameras is mounted facing a direction of travel of the vehicle and another one of the plurality of cameras is mounted facing a direction perpendicular to the direction of travel.

6. The method of claim 5, wherein the videos and/or images from the plurality of cameras are stitched together.

7. The method of claim 1, wherein the vehicle performs at least one of ride sharing, vehicle sharing, and autonomous operation.

8. The method of claim 1, further comprising:
   identifying a location of the vehicle relative to a geofenced area; and
   receiving a plurality of requests for the vehicle, wherein the plurality of requests are limited to the geofenced area.

9. The method of claim 1, wherein the vehicle is used for ridesharing and further comprising altering a route of the vehicle to include the location and heading of the request.

10. The method of claim 1, wherein the vehicle is used for ridesharing and further comprising receiving a video and/or image ridesharing request, wherein the video and/or image ridesharing request includes a route including the location and heading of the request and does not involve driving a ridesharing passenger.

11. A method for capturing video and/or images for a mapping system, comprising:
   recording a plurality of videos and/or images during operation of a vehicle using a camera built into the vehicle;
   storing the plurality of videos and/or images along with vehicle locations and a vehicle headings, respectively;
   wirelessly receiving a request from a remote server for a video and/or an image, wherein the request specifies a location and a heading for the video and/or image;
   comparing the vehicle locations and the vehicle headings of the plurality of videos and/or images to the location and the heading of the request; and
   if a match occurs, uploading the video and/or image for the request to the remote server.

12. The method of claim 11, wherein the request further specifies a time of day.

13. The method of claim 11, wherein the plurality of videos and/or images are recorded during daylight and not recorded when daylight is absent.

14. The method of claim 11, further comprising recording the video and/or image using a camera mounted on the vehicle, wherein the camera is mounted facing a direction of travel of the vehicle.

15. The method of claim 14, further comprising recording the video and/or image using a plurality of cameras mounted on the vehicle, wherein the videos and/or images from the plurality of cameras are stitched together.

16. The method of claim 15, wherein at least one of the plurality of cameras is mounted facing a direction of travel of the vehicle and another one of the plurality of cameras is mounted facing a direction perpendicular to the direction of travel.

17. The method of claim 11, further comprising:
identifying a location of a vehicle relative to a geofenced area; and
receiving a plurality of requests for the vehicle, wherein the plurality of requests are limited to the geofenced area.

18. The method of claim 11, wherein the vehicle is used for ridesharing and further comprising altering a route of the vehicle to include the location and heading of the request.

19. The method of claim 11, wherein the vehicle is used for ridesharing and further comprising receiving a video and/or image ridesharing request, wherein the video and/or image ridesharing request includes a route including the location and heading of the request and does not involve driving a ridesharing passenger.

20. A video and/or image mapping system for a vehicle, comprising:
a transceiver module configured to communicate with a remote server;
an outwardly-directed camera built into the vehicle and configured to record videos and/or images; and
an image capture module configured to at least one of:
a) receive a request at the vehicle for a video and/or an image from a remote server, wherein the request identifies a location and heading; and
cause the outwardly-directed camera to record a video and/or an image when a location and heading of the vehicle matches the location and the heading of the request; and/or
b) record a plurality of videos and/or images during operation of the vehicle;
store the plurality of videos and/or images along with a location and heading of the vehicle;
receive a request from a remote server for a video and/or an image, wherein the request specifies a location and a heading for the video and/or image;
compare the locations and heading of the vehicle for the plurality of videos and/or images to the location and the heading of the request; and
if a match occurs, upload the video and/or image for the request to the remote server.

\* \* \* \* \*